US012800137B2

(12) United States Patent
Kandukuri et al.

(10) Patent No.: US 12,800,137 B2
(45) Date of Patent: Nov. 17, 2026

(54) VIRTUAL SPACE DIVIDER WITH FOOTWELL ILLUMINATION

(71) Applicant: B/E Aerospace, Inc., Winston-Salem, NC (US)

(72) Inventors: Ravindra Ramulu Kandukuri, Secunderabad (IN); Krishna Chaitanya Prathipati, Hyderabad (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 51 days.

(21) Appl. No.: 19/247,947

(22) Filed: Jun. 24, 2025

(65) Prior Publication Data

US 2026/0055887 A1 Feb. 26, 2026

(30) Foreign Application Priority Data

Aug. 23, 2024 (IN) ............................ 202411063921

(51) Int. Cl.

| | |
|---|---|
| ***F21V 33/00*** | (2006.01) |
| ***B60N 2/75*** | (2018.01) |
| ***B64D 11/06*** | (2006.01) |
| ***F21V 23/00*** | (2015.01) |
| ***F21V 23/04*** | (2006.01) |
| *F21W 106/00* | (2018.01) |
| *F21W 131/301* | (2006.01) |
| *F21Y 115/10* | (2016.01) |

(52) U.S. Cl.

CPC .......... *F21V 33/0012* (2013.01); *B60N 2/797* (2018.02); *B64D 11/06* (2013.01); *F21V 23/002* (2013.01); *F21V 23/0471* (2013.01); *F21W 2106/00* (2018.01); *F21W 2131/301* (2013.01); *F21Y 2115/10* (2016.08)

(58) Field of Classification Search

CPC ....... B60N 2/797; B64D 11/06; F21V 23/002; F21V 23/0471; F21V 33/0012

See application file for complete search history.

(56) References Cited

U.S. PATENT DOCUMENTS 4,794,373 A 12/1988 Harrison
5,931,532 A * 8/1999 Kemmerer ............... A61G 5/14 297/DIG. 10
9,221,386 B2 12/2015 Takahashi et al.
(Continued)

FOREIGN PATENT DOCUMENTS

EP 2996096 B1 3/2016
EP 3587186 B1 1/2020
(Continued)

*Primary Examiner* — Gerald J Sufleta, II
(74) *Attorney, Agent, or Firm* — Suiter Swantz IP

(57) ABSTRACT

A passenger encroachment indicator may include a light assembly incorporated within a housing of a passenger seat, the light assembly comprising: a light source configured to transmit a beam outward from the housing; and a diffuser configured to shape the beam, wherein a projection of the beam forms a visual marker that defines a passenger seating boundary between the passenger seat and an adjacent passenger seat. The beam may also assist the passenger in detecting objects that have fallen on the floor. A passenger encroachment indicator may include a wiring harness electrically coupled between the light assembly and a power source, wherein the wiring harness is incorporated within the housing.

14 Claims, 8 Drawing Sheets

(56) References Cited

U.S. PATENT DOCUMENTS

| | | | | |
|---|---|---|---|---|
| 10,464,476 | B1 * | 11/2019 | Mazuir | B60Q 3/60 |
| 11,439,528 | B2 | 9/2022 | Gilbert, Jr. | |
| 11,945,589 | B2 * | 4/2024 | Klaus | B64D 11/0626 |
| 2020/0086783 | A1 * | 3/2020 | Colletti | B60Q 3/233 |
| 2021/0371110 | A1 | 12/2021 | Penley et al. | |
| 2023/0339618 | A1 * | 10/2023 | Gupta | B64D 25/14 |
| 2024/0172349 | A1 | 5/2024 | Coleman | |

FOREIGN PATENT DOCUMENTS

| | | | |
|---|---|---|---|
| EP | 3626526 | B1 | 3/2020 |
| EP | 4270341 | A3 | 11/2023 |
| FR | 2983811 | B1 | 6/2013 |
| GB | 2603198 | B | 8/2022 |

* cited by examiner

VIRTUAL SPACE DIVIDER WITH FOOTWELL ILLUMINATION

CROSS-REFERENCE TO RELATED APPLICATION

The present application claims the benefit to India Provisional Patent Application No. 202411063921, filed Aug. 23, 2024, which is incorporated by reference in the entirety.

BACKGROUND

Seating arrangements in aircraft often require passengers to sit next to each other in rows. While it is customary for passengers to not encroach onto the seating area of another passenger, a passenger may occasionally adopt a sitting position with their legs wide apart in such a way that encroaches into an adjacent seat, an activity often referred to as "manspreading". The use of physical devices can be used to encourage passengers not to encroach onto adjacent seats. However, these physical devices can be bulky, reducing the effective space for each passenger while adding weight to the aircraft. Therefore, there is a need for reducing or preventing manspreading in an aircraft, vehicle, or seated venue, which avoids the shortcomings of conventional approaches.

SUMMARY

In some aspects, the techniques described herein relate to a passenger encroachment indicator including: a light assembly incorporated within a housing of a passenger seat, the light assembly including: a light source configured to transmit a beam outward from the housing; and a diffuser configured to shape the beam, wherein a projection of the beam forms a visual marker that defines a passenger seating boundary between the passenger seat and an adjacent passenger seat; and a wiring harness electrically coupled between the light assembly and a power source, wherein the wiring harness is incorporated within the housing.

In some aspects, the techniques described herein relate to a passenger encroachment indicator, wherein the housing includes an armrest housing.

In some aspects, the techniques described herein relate to a passenger encroachment indicator, further including the armrest housing.

In some aspects, the techniques described herein relate to a passenger encroachment indicator, wherein the beam forms an arc of light.

In some aspects, the techniques described herein relate to a passenger encroachment indicator, wherein the beam projects into a footwell between the passenger seat and the adjacent passenger seat.

In some aspects, the techniques described herein relate to a passenger encroachment indicator, wherein the light source includes a light emitting diode.

In some aspects, the techniques described herein relate to a passenger encroachment indicator, further including a control circuit configured to switch the light source from an OFF state to an ON state upon receiving an input.

In some aspects, the techniques described herein relate to a passenger encroachment indicator, further including gesture-controlled sensor communicatively coupled to the control circuit, wherein upon sensing a gesture, the gesture-controlled sensor transmits the input to the control circuit.

In some aspects, the techniques described herein relate to a passenger seat including: a passenger encroachment indicator including: a light assembly at least incorporated within a housing of the passenger seat, the light assembly including: a light source configured to transmit a beam outward from the housing; and a diffuser configured to shape the beam, wherein a projection of the beam forms a visual marker that defines a passenger seating boundary between the passenger seat and an adjacent passenger seat; and a wiring harness electrically coupled between the light assembly and a power source, wherein the wiring harness is incorporated, or partially incorporated, within the housing.

In some aspects, the techniques described herein relate to a passenger seat, further including an armrest, wherein the housing includes an armrest housing, wherein the light source is configured to transmit the beam outward from the armrest housing.

In some aspects, the techniques described herein relate to a passenger seat, further including a passenger encroachment barrier configured to provide a physical barrier between the passenger seat and the adjacent passenger seat, wherein the passenger encroachment barrier includes a barrier housing, wherein the light source configured to transmit the beam outward from the barrier housing.

In some aspects, the techniques described herein relate to a passenger seat, wherein the beam forms an arc of light.

In some aspects, the techniques described herein relate to a passenger seat, wherein the beam projects into a footwell between the passenger seat and the adjacent passenger seat.

In some aspects, the techniques described herein relate to a passenger seat, wherein the light source includes a light emitting diode.

In some aspects, the techniques described herein relate to a passenger seat, further including a control circuit configured to switch the light source from an OFF state to an ON state upon receiving an input.

In some aspects, the techniques described herein relate to a passenger seat, further including a gesture-controlled sensor communicatively coupled to the control circuit, wherein upon sensing a gesture, the gesture-controlled sensor transmits the input to the control circuit.

In some aspects, the techniques described herein relate to a passenger seat, further including a controller communicatively coupled to the light source and configured to switch the light source between an OFF state and an ON state; and a sensor communicatively coupled to the controller and configured to detect an encroachment of an adjacent passenger to the passenger seat boundary, whereupon a detection of an encroachment of the adjacent passenger to the passenger seat boundary, the controller causes the light source to switch from the OFF state to the ON state.

In some aspects, the techniques described herein relate to a passenger seat, whereupon a lack of detection of the encroachment of the adjacent passenger to the passenger seat boundary, the controller causes the light source to switch from the ON state to the OFF state.

In some aspects, the techniques described herein relate to a passenger seat, wherein the light source is configured to illuminate a portion of a floor adjacent to the passenger seat, wherein the light source enables a passenger to detect an object dropped on the portion of the floor.

In some aspects, the techniques described herein relate to a method for informing a passenger of an encroachment upon a passenger seat boundary including: switching a light source from an OFF state to an ON state, wherein switching the light source from the OFF state to the ON state causes an arc of light to project into a footwell, generating a visual marker that defines a passenger seating boundary between two adjacent passenger seats.

In some aspects, the techniques described herein relate to a method further including before switching the light source, gesturing to a gesture-controlled sensor communicatively coupled to the light source.

In some aspects, the techniques described herein relate to a method, wherein the arc of light emanates from an armrest.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Figure 1:
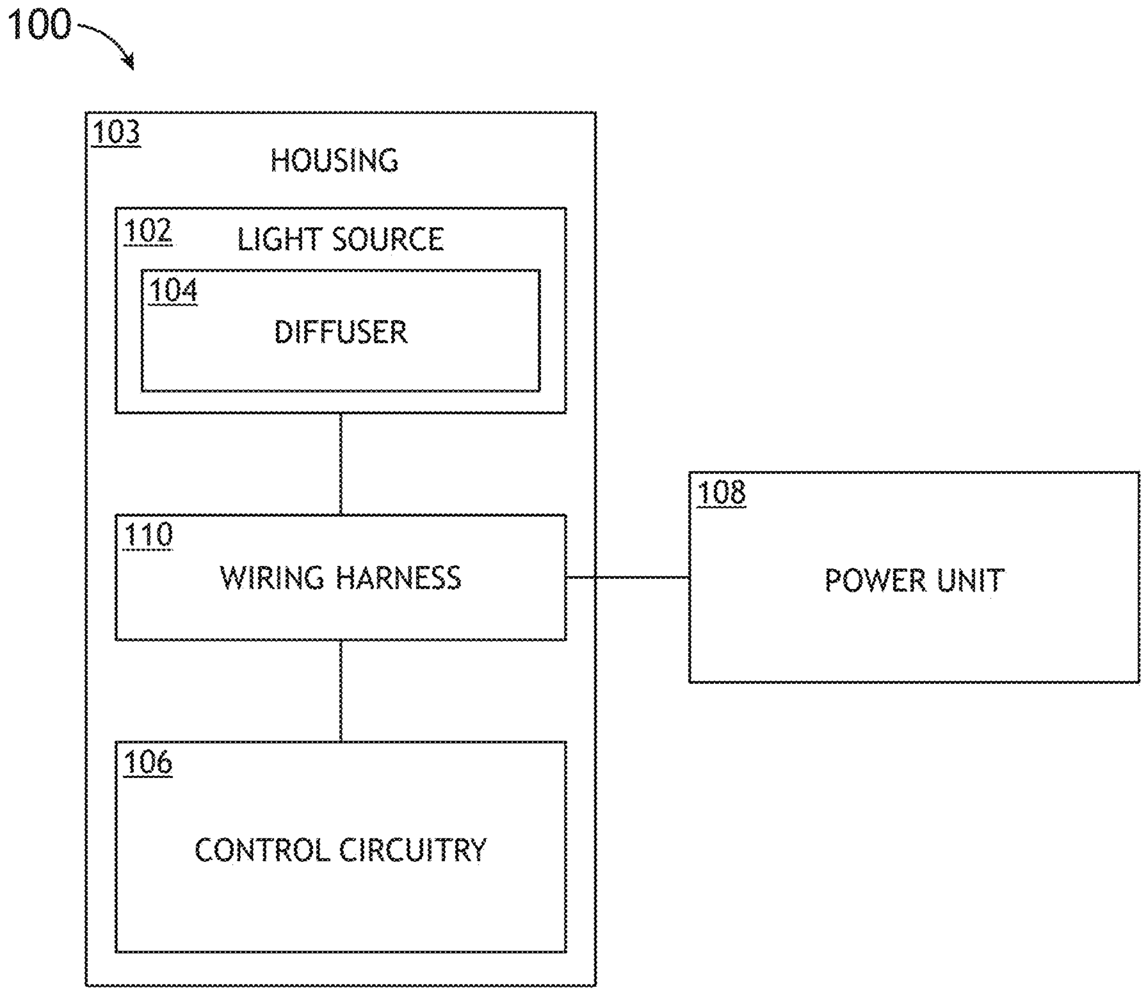
FIG. 1 is a block diagram of a passenger encroachment indicator system for a passenger seat, in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A passenger encroachment indicator is disclosed. The passenger encroachment indicator provides a light that is projected from a passenger seat, such as from a passenger seat armrest, towards a footwell between two adjacent seats. The light provides an indication (e.g., a visual marker) of a boundary between the adjacent passenger seats, indicating to the adjacent passengers where the respective legs of the passengers should be placed (e.g., within their own seating envelope). By indicating to the passenger, the boundary by which their legs should be placed, the behaviors of passengers positioning their legs into another passenger's seating envelope, also referred to as manspreading, may be reduced. The light may also assist the passenger by illuminating the floor, such as a portion of the floor adjacent to the passenger seat, enabling the passenger to detect objects dropped on the floor and to assist the passenger in walking between the rows of passenger seats.

FIG. 1 is a block diagram of a passenger encroachment indicator system 100 for a passenger seat, in accordance with one or more embodiments of the disclosure. The System 100 may include a passenger encroachment indicator and may further include a passenger seat or a passenger seat component, such as an armrest.

In embodiments, the passenger encroachment indicator may include a light source 102 (e.g., a light assembly) configured to transmit a light beam (e.g., outward from a passenger seat housing) that defines a passenger seat boundary between the passenger seat and an adjacent passenger seat. The light beam and/or the projection of the light beam, such as on a passenger seat surface or an aircraft floor, provides a visual marker of a passenger seating boundary for a passenger of the passenger seat and/or an adjacent passenger of the adjacent passenger seat. The light source 102 may include any type of light technology or device including, but not limited to, a light emitting diode, an incandescent bulb, a compact fluorescent lamp, a halogen bulb, a fluorescent tube, a high-intensity discharge lamp, a laser light, an organic, light-emitting diode, or a plasma light. For example, the light source 102 may include a light-emitting diode configured to fit within, or be integrated into, a housing 103, such as a housing of a passenger seat or an armrest housing.

In embodiments, the system 100 includes a diffuser 104 configured to shape the light or light beam as the light is projected from the light source 102. The diffuser 104 may cause the light beam to take any shape that indicates to the passenger the passenger seat boundary. For example, the diffuser 104 may form the beam of light into a vertical arc that illuminates a lower portion of the passenger seat and/or a backside of a forward passenger seat (e.g., a seat in front of the passenger seat that is using the system 100. For instance, a topmost ray of the projected light beam may project to approximately the armrest area of the forward seat. In another example, the diffuser 104 may illuminate a footwell in front of the passenger seat. For instance, a bottommost ray of the projected light beam may project to approximately a footrest pedal or leg of the forward seat. In another example, the diffuser 104 may cause the light beam to have a relatively thin width. For instance, the diffuser 104 may cause the light to form a vertical arc of light with a thin horizontal width. By forming a thin arc of light, the diffuser 104 shapes the light into a form that may resemble a physical or privacy divider.

In embodiments, the system 100 includes control circuity 106 configured to control the operation of the light source 102. The control circuity 106 may include electrical circuits to control one or more of; power to the light source 102, intensity of the light from the light source 102, gesture detection, a direction the beam projected from the light source 102, and changes to the beam shape by adjusting the diffuser 104.

In embodiments, the system 100 may further include a power unit 108 configured to deliver power to the light source 102. The power unit 108 may be configured as a battery (e.g., incorporated within or outside of the housing 103) or as a power link to an external power source, such as a cabin power source within an aircraft. The power unit and the control circuitry may be electrically coupled to the light source 102 via a wiring harness 110.

Figure 2:
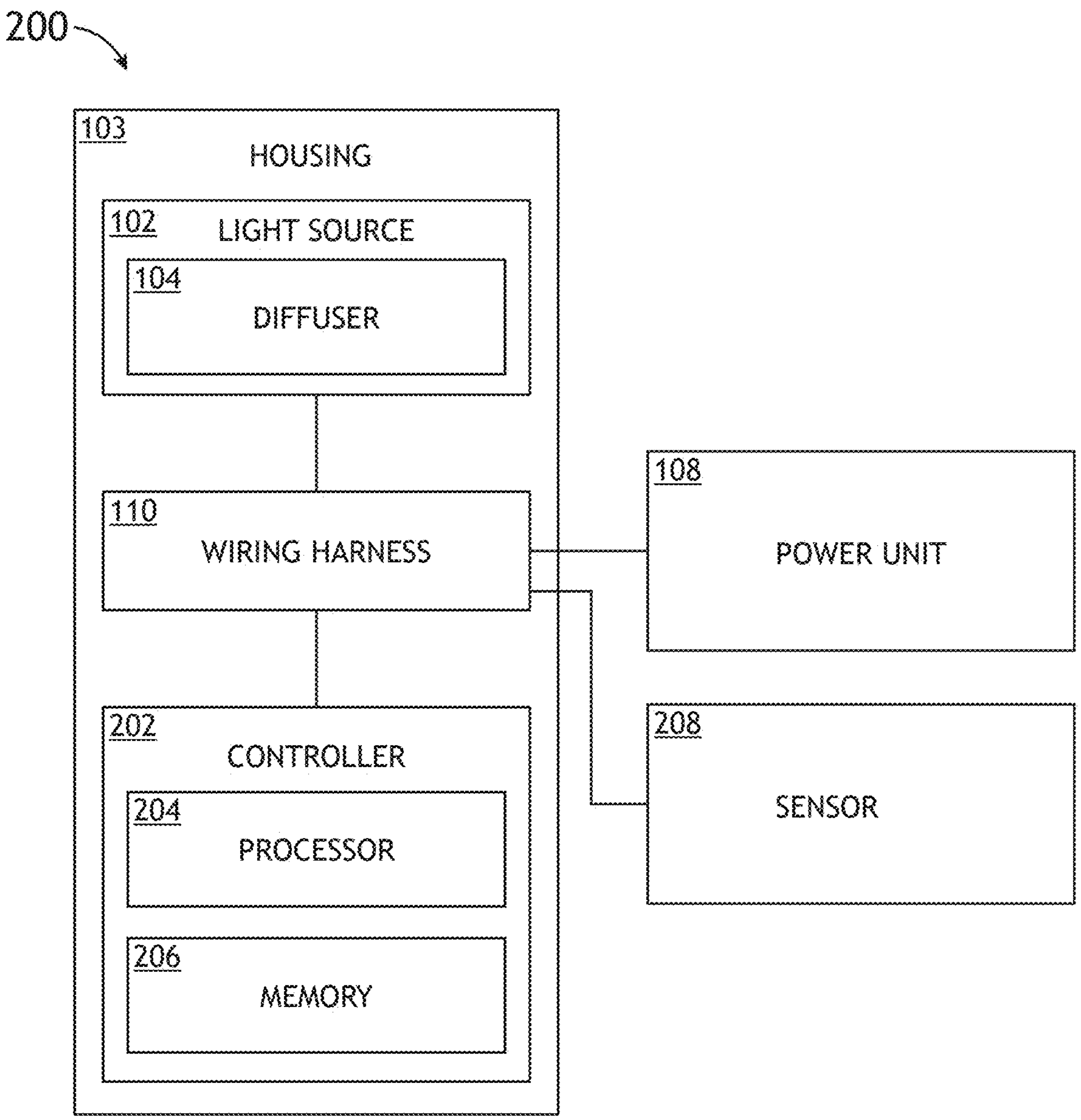
FIG. 2 is a block diagram of a passenger encroachment indicator system for a passenger seat, in accordance with one or more embodiments of the disclosure.

FIG. 2 is a block diagram of a passenger encroachment indicator system 200 for a passenger seat, in accordance with one or more embodiments of the disclosure. The system 200 may include one or more aspects and/or components of the system 100, and vice-versa. In embodiments, the system 200 includes a controller 202 that includes one or more processors 204 and memory 206. The controller 202 is configured to provide processing functionality for one or more functions of the system. Systems 100, 200 may be utilized in any venue or vehicle where two or more seats are arranged adjacent to each other including but not limited to, concert halls, movie theaters, aircraft, and busses.

In embodiments, the system 200 includes a sensor 208 communicatively coupled to the controller 202. The sensor 208 may be configured to detect a gesture by a passenger or an adjacent passenger and cause the system to switch a state of the light source (e.g., OFF, ON) upon a detection of the gesture. For example, the sensor 208 may be configured so that a passenger, noticing an adjacent passenger encroaching onto their passenger seating boundary, may draw a finger or object over the sensor 208, causing the light source 102 to switch from an OFF state to an ON state. In another example, an encroaching passenger may himself/herself trigger the sensor, causing the light source 102 to switch from an OFF state to an ON state. The system 200 may then be configured to switch the light source 102 from an ON state to an OFF state upon the encroaching passenger retreating from the passenger seating boundary and/or a signal from the passenger (e.g., a second trigger by a finger/object, or the removal of the finger/object from the vicinity of the sensor 208). The sensor 208 may include any type of gesture-activated sensor, object detection sensor, or motion detection sensor.

Figure 3:
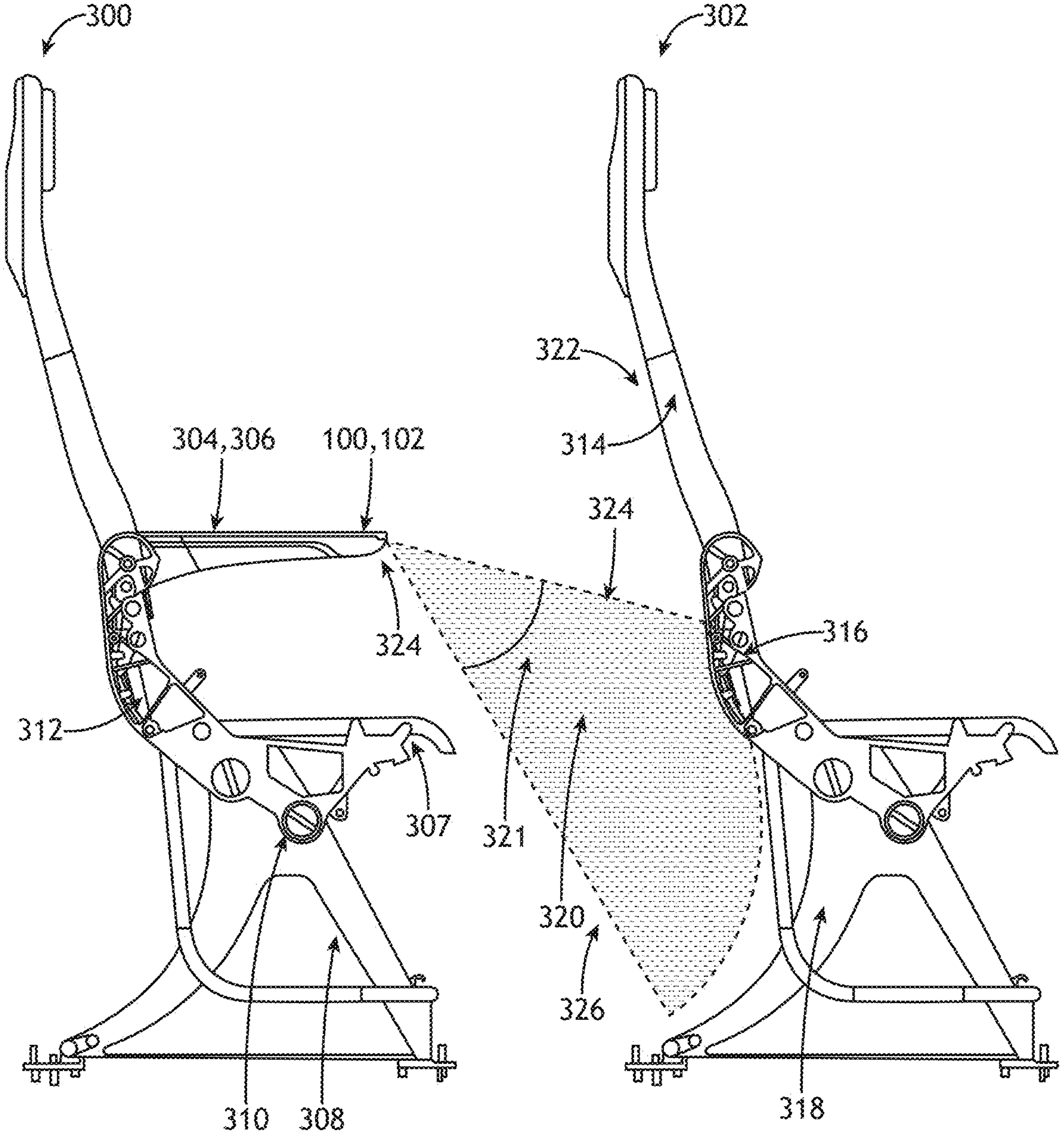
FIG. 3 illustrates a drawing depicting a side-view of a passenger seat and a forward passenger seat, in accordance with one or more embodiments of the disclosure.

FIG. 3 illustrates a drawing depicting a side view of a passenger seat 300 and a forward passenger seat 302, in accordance with one or more embodiments of the disclosure. The system 100, 200 is shown incorporated into an armrest housing 304 of an armrest 306. However, the system 100, 200 may also be incorporated within different seat components or housings of different seat components including, but not limited to a seat pan 307, a seat leg assembly 308. a spreader bar 310, and portions of the seat frame 312. The system 100, 200 may also be incorporated into the forward passenger seat 302 (e.g., to transmit light backward toward the passenger seat 300). For example, the system 100, 200 may be incorporated into a seatback 314, frame 316, or seat leg assembly 318 of the forward passenger seat 302. The system 100,200 may also be incorporated into a console or table formed at the junction between two adjacent seats 300. The system 100, 200 is shown projecting an arc 320 of light (e.g., having a central angle 321) against a backside 322 of the forward passenger seat via a window 324 within the armrest housing 304 (e.g., the arc 320 of light emanating from the armrest 306 or armrest housing 304).

In embodiments, the arc 320 of light may have a central angle 321 (e.g., a central angle whose apex is at the window 324) of less than 90°, of less than 75°, of less than 60°, of less than 45°, of less than 30°, or of less than 15°. In embodiments, the arch of light may have a horizontal width (e.g., a width of the light beam as it projects on the floor or backside of the forward passenger seat) of less than 20 cm, of less than 10 cm, or less than 5 cm, or of less than 3 cm. In embodiments, the light emitted from the light source 102 may have a maximal throw length of less than 100 cm, of less than 75 cm, of less than 50 cm, or of less than 25 cm. The light beam may be of any color, such as a soft white color or other color that is not bothersome to a passenger. The light beam may also be bright enough to assist the passenger in finding objects that have fallen to the floor and/or determining a space on the floor to place one's feet when attempting to enter or exit the seat.

In embodiments, the light source 102 may project other light shapes and/or beams. For example, the light source 102 may project one or more beams that produce a shape, including, but not limited to, an arc, a square, a rectangle, a triangle, or other shape or polygon. In another example, the light source 102 may produce beams or portions of beams with differing intensity. For instance, for a light source 102 projecting an arc 320 of light, the arc 320 may include a top border 325 and a bottom border 326 having a brighter intensity than a central portion of the arc 320.

Figure 4:
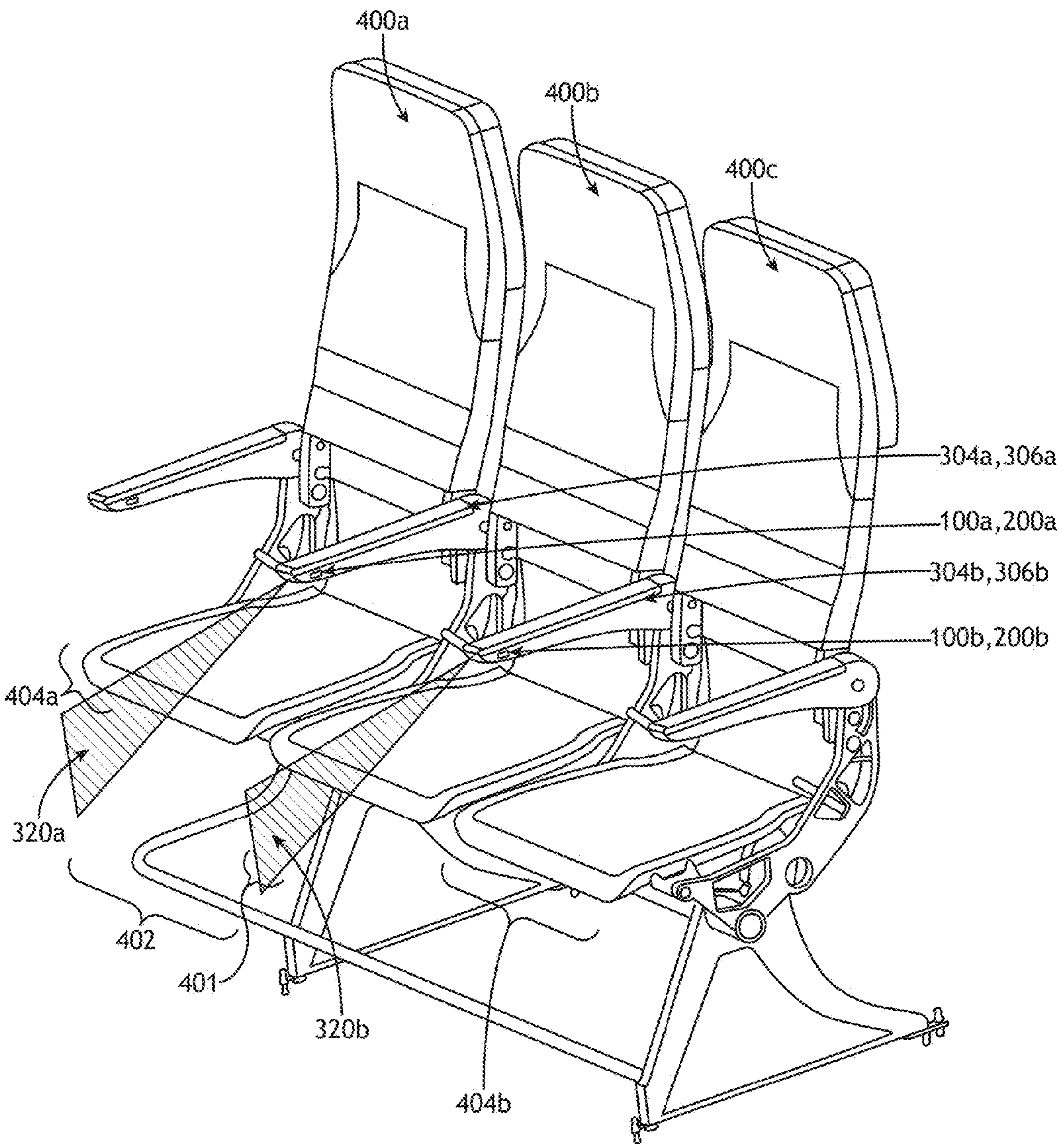
FIG. 4 illustrates a drawing depicting a perspective view of a passenger seat positioned between two adjacent passenger seats, in accordance with one or more embodiments of the disclosure.

FIG. 4 illustrates a drawing depicting a perspective view of a passenger seat 300 positioned between two adjacent passenger seats 400*a-b*, in accordance with one or more embodiments of the disclosure. As illustrated, the passenger seat 300 includes two systems 100*a-b*, 200*a-b* incorporated into two armrest housings 304*a-b*. One or both arrest housings 304*a-b* may be considered an armrest housing of the adjacent passenger seats 400*a-b* or may be considered as shared housings between the passenger seat 300 and the adjacent passenger seats 400. Therefore, the above description should not be interpreted as a limitation on the embodiments of the present disclosure but merely as an illustration.

The systems 100*a-b*, 200*a-b* project arcs 320*a-b* of light having a horizontal width 401 defining a passenger seating boundary 402 for the passenger seat 300, indicating to passengers sitting in the adjacent passenger seats 400*a-b* to position themselves so that their bodies, particularly legs and feet, do not encroach onto the passenger seating boundary 402 of the passenger seat 300. The arcs 320*a-b* of light may also define a passenger seating boundary 404*a-b* for the adjacent passenger seats 400*a-b*.

Figure 5:
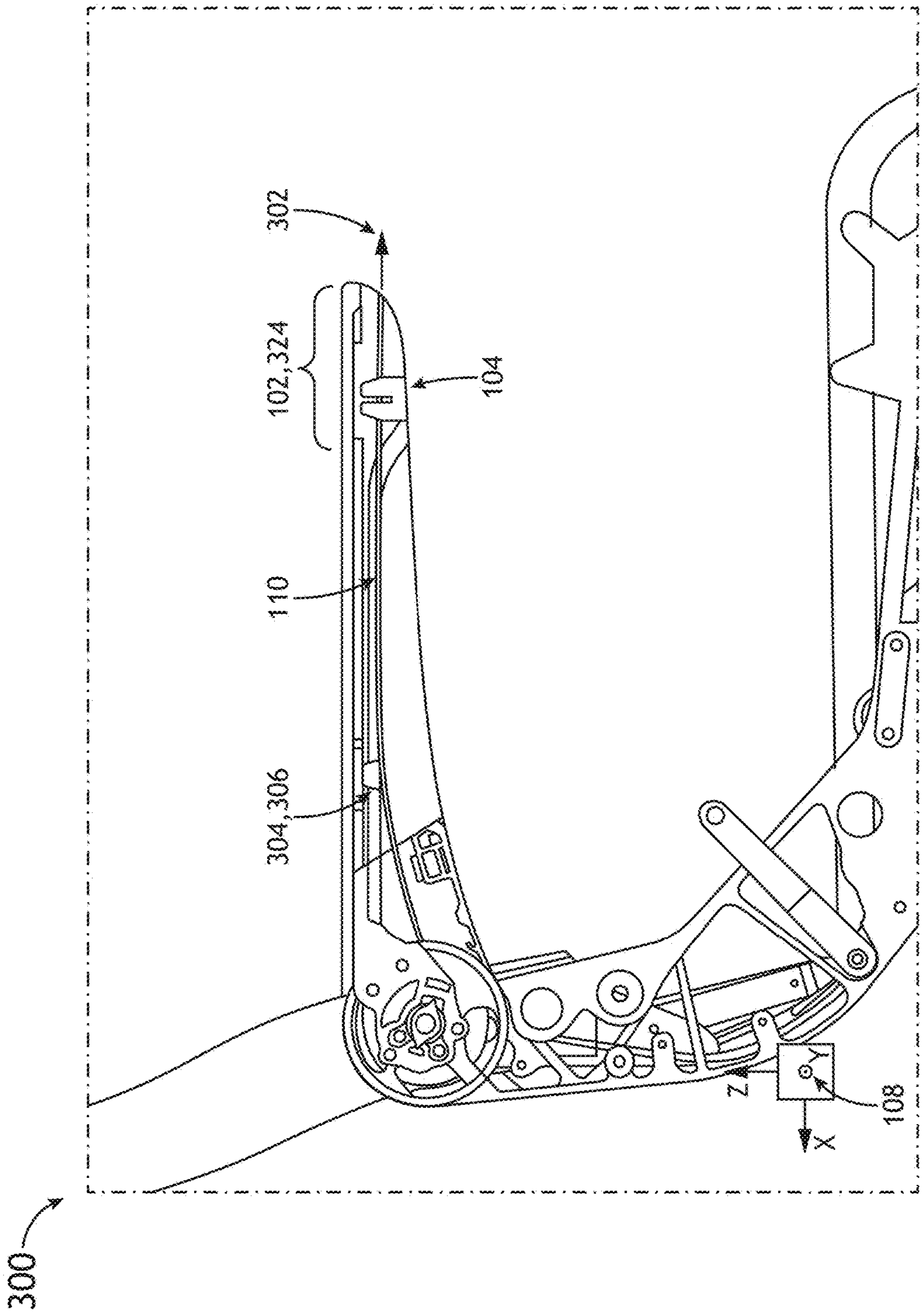
FIG. 5 illustrates a close-up side view of a portion of the passenger seat positioned between two adjacent passenger seats, in accordance with one or more embodiments of the disclosure.

FIG. 5 illustrates a close-up side view of a portion of the passenger seat 300 positioned between two adjacent passenger seats 400*a-b*, in accordance with one or more embodiments of the disclosure. The armrest housing 304 may incorporate the light source 102 and the diffuser 104 near the window 324 from where the arc 320 of light is projected. The diffuser 104 is shown as a single slit diffuser that can shape light from the light source The wiring harness 110 delivers power from the power unit 108 (e.g., a battery or connector for cabin electricity) to the light source 102 as well as the control circuitry 106 or controller 202 (not shown).

Figure 6:
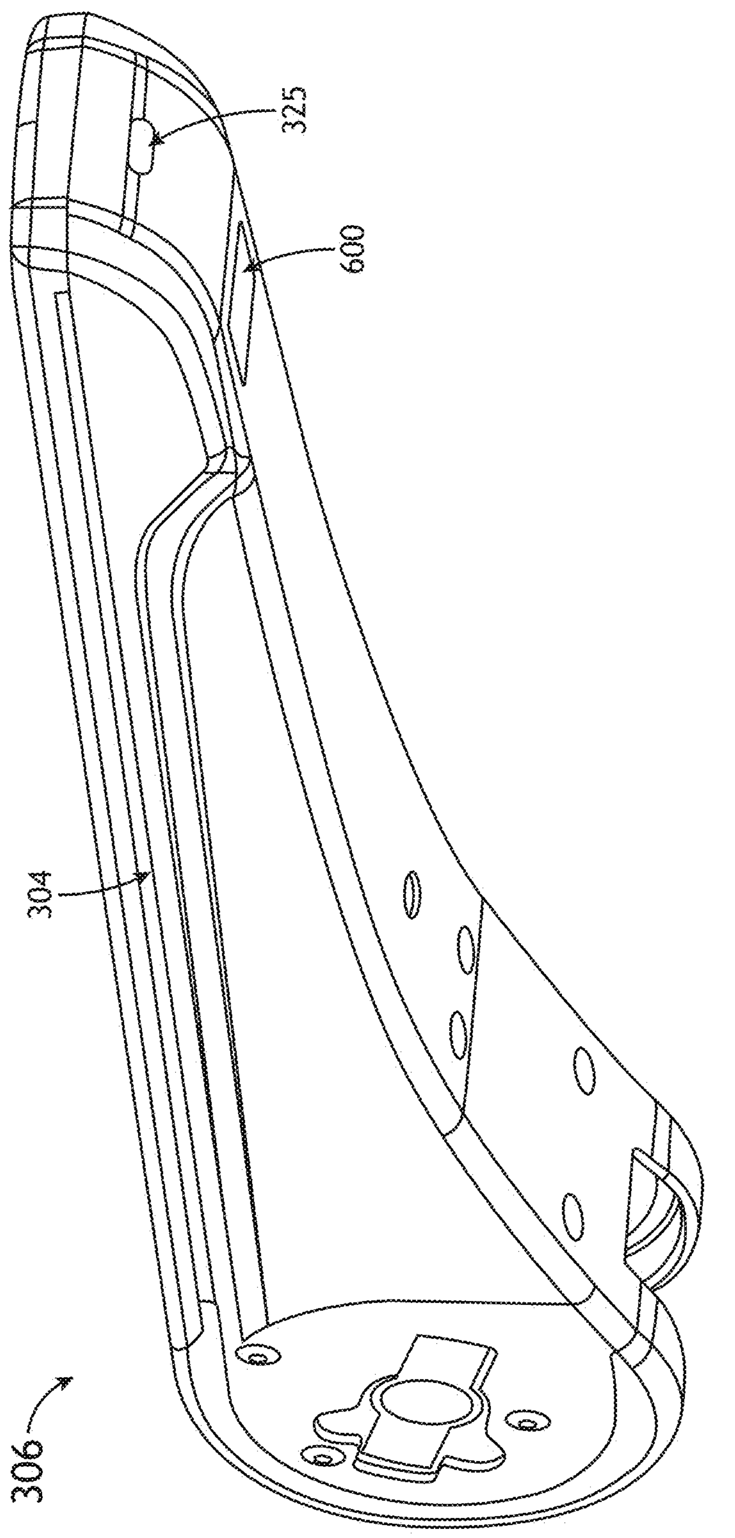
FIG. 6 illustrates a perspective view of an armrest that incorporates the system, in accordance with one or more embodiments of the disclosure.

FIG. 6 illustrates a perspective view of an armrest 306 that incorporates the system 100, 200, in accordance with one or more embodiments of the disclosure. In embodiments, the system 100, 200 includes a human interface 600 coupled to the light source 102, control circuity 106, and/or controller that enables a passenger or operator to control the system 100, 200 via an input. For example, the human interface 600 may include a button that can be manually pressed or touched by a passenger, allowing the passenger to toggle the light source from an OFF state to an ON state. In another example, the human interface 600 may include a gesture-controlled or gesture-recognition technology that can detect the movement of a passenger to toggle the light source 102 from the OFF state to the ON state. For example, a passenger may purposefully wave a hand across a gesture-recognition sensor of the human interface 600 to toggle the light source 102 to the ON state. In another example, an adjacent passenger may trigger the human interface if a gesture-recognition sensor recognizes a movement of an adjacent passenger's leg or foot encroaching into the passenger seating boundary 402. In another example, the human interface 600 may include a receiver or transmitter-receiver that can receive a signal from a passenger or attendant to toggle the light source 102 to the OFF state. For instance, the human interface 600 may include a receiver and circuitry that allow the passenger or attendant to communicate with the system 100, 200 via Bluetooth, Wi-Fi, infrared, Near field Communication, Zigbee, Long Range (LoRa), ultrasound, or visible light communication (VLC) technologies.

Figure 7:
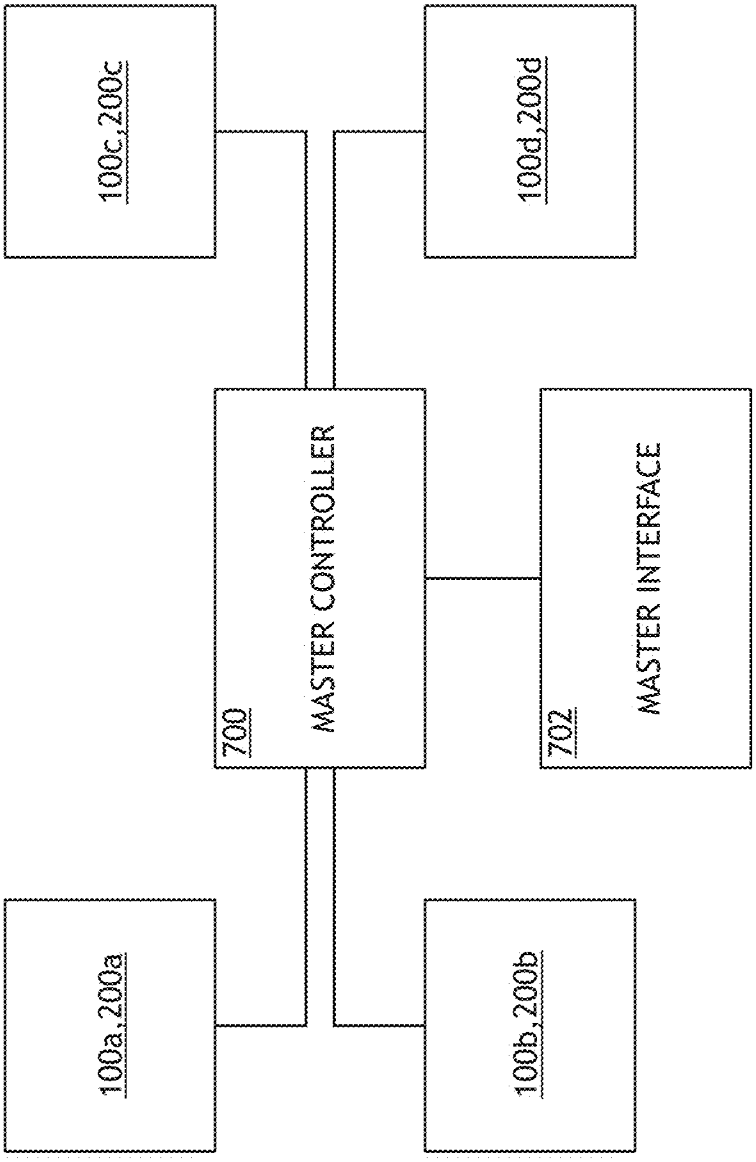
FIG. 7 illustrates a block diagram depicting an arrangement of systems in accordance with one or more embodiments of the disclosure.

FIG. 7 illustrates a block diagram depicting an arrangement of systems 100*a-d*, 200*a-d*, in accordance with one or more embodiments of the disclosure. In embodiments, a plurality of systems 100*a-d*. 200*a-d* are communicatively coupled to, and controlled via, a master controller 700, the master controller 700 including one or more processors and memory. For example, the master controller 700 may be configured to toggle the light sources 102 of individual systems 100, 200. For example, an attendant utilizing the master controller 700 (e.g., via a master interface 702) may toggle a light source 102 of a system 200 to an ON status (e.g., if the attendant notices an unruly passenger encroaching the seating boundary of another passenger). In another example, an attendant may utilize the master controller 700 via the master interface 702 to toggle all of the systems 100, 200 of an aircraft to an OFF status (e.g., at the end of a flight). The master controller 700 may be communicatively coupled to any number of systems 100, 200 including, but not limited to, two systems 100, 200, three systems 100, 200, four systems 100, 200, eight systems 100, 200, or ten or more systems 100, 200. For example, the master controller 700 may be communicatively coupled to a portion, or all, systems 100, 200 within an aircraft.

In embodiments, the system 100, 200 further includes a passenger encroachment barrier or configured to provide a physical barrier between the passenger seat 300 and an adjacent passenger seat 402*a-b*. For example, the passenger encroachment barrier may include a small panel or privacy barrier that is incorporated within the passenger seat. In embodiments, the passenger encroachment barrier includes a housing (e.g., a barrier housing), with the light source 102 incorporated into the housing.

Figure 8:
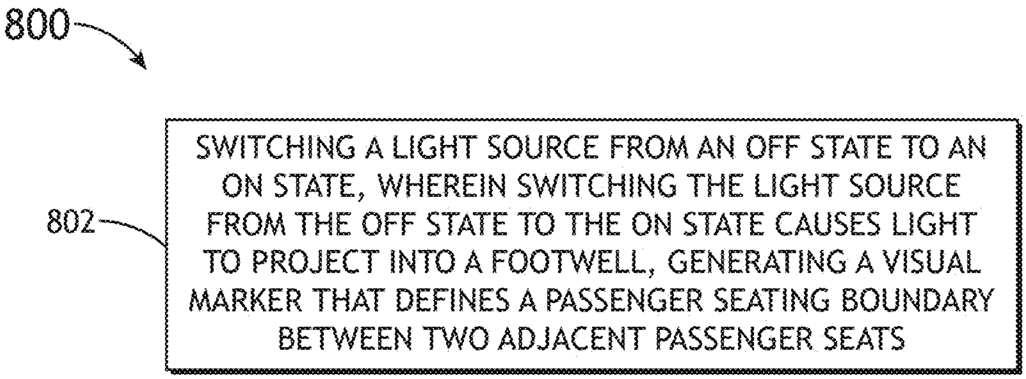
FIG. 8 illustrates a process flow diagram (OFF to ON, we can have ON to OFF as well, upon passengers retreating into his own boundaries) depicting a method for informing a passenger (e.g., an adjacent passenger) of an encroachment upon a passenger seat boundary, in accordance with one or more embodiments of the disclosure.

FIG. 8 illustrates a process flow diagram depicting a method 800 for informing a passenger (e.g., an adjacent passenger) of an encroachment upon a passenger seat boundary 402, in accordance with one or more embodiments of the disclosure. The method 800 may be used for seats, such as passenger seats or theater seats that incorporate the systems 100, 200 as described herein.

In embodiments, the method 800 include a step 802 of switching a light source 102 from an OFF state to an ON state, wherein switching the light source 102 from the OFF state to the ON state causes an arc 320 of light to project into a footwell or a backside of a forward passenger seat, generating a visual marker that defines a passenger seating boundary 402 between two adjacent passenger seats. In embodiments, the method 800 further includes a step of, before switching the light source, gesturing to a gesture-controlled sensor communicatively coupled to the light source. The gesture may include an intentional gesture made by a passenger to toggle the light source 102 to an ON state, or may include a detection of a leg or foot of an adjacent passenger that has encroached upon the passenger seating boundary 420.

In embodiments, the method 800 may also include a step of switching the light source 102 from an ON state to an OFF state. For example, the system 100, 200 may be configured to detect that an adjacent passenger is no longer encroaching (e.g., a lack of encroachment) upon the passenger seat boundary 402 (e.g., the adjacent passenger having retreated into their respective passenger seat). Upon a detection of the adjacent passenger no longer encroaching upon the passenger seat boundary 402, the system 100, 200 may then cause the light source 102 to switch from an ON state to an OFF state.

The one or more processors 204 of the controller 202 may include any processor or processing element known in the art. For the purposes of the present disclosure, the term "processor" or "processing element" may be broadly defined to encompass any device having one or more processing or logic elements (e.g., one or more micro-processor devices, one or more application-specific integrated circuit (ASIC)

devices, one or more field programmable gate arrays (FPGAs), or one or more digital signal processors (DSPs)). In this sense, the one or more processors 204 may include any device configured to execute algorithms and/or instructions (e.g., program instructions stored in memory). In embodiments, the one or more processors 204 may be embodied as a desktop computer, mainframe computer system, workstation, image computer, parallel processor, networked computer, or any other computer system configured to execute a program configured to operate or operate in conjunction with the system 200, as described throughout the present disclosure.

Moreover, different subsystems of the system 200 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller 202 or, alternatively, multiple controllers. Additionally, the controller 202 may include one or more controllers housed in a common housing or within multiple housings. In this way, any controller or combination of controllers may be separately packaged as a module suitable for integration into the system 200.

The memory medium 206 may include any storage medium known in the art suitable for storing program instructions executable by the associated one or more processors 204. For example, the memory medium 206 may include a non-transitory memory medium. By way of another example, the memory medium 206 may include, but is not limited to, a read-only memory (ROM), a random-access memory (RAM), a magnetic or optical memory device (e.g., disk), a magnetic tape, a solid-state drive and the like. It is further noted that memory medium 206 may be housed in a common controller housing with the one or more processors 204. In embodiments, the memory medium 206 may be located remotely with respect to the physical location of the one or more processors 204 and controller 202. For instance, the one or more processors 204 of controller 202 may access a remote memory (e.g., server), accessible through a network (e.g., internet, intranet and the like).

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A passenger encroachment indicator comprising:
- an armrest for an aircraft passenger seat, the armrest comprising an armrest housing, wherein the armrest housing comprises a window;
- a light assembly non-movably disposed within the armrest housing, the light assembly comprising:
  - a light source configured to transmit a light beam; and
  - a diffuser configured to shape the light beam, wherein the light beam is projected through the window, wherein a projection of the light beam forms a visual marker that projects into a footwell between the aircraft passenger seat and an adjacent aircraft passenger seat, and defines a passenger seating boundary between the aircraft passenger seat and the adjacent aircraft passenger seat; and
- a wiring harness electrically coupled between the light assembly and a power source, wherein the wiring harness is incorporated at least partially within the armrest housing.

2. The passenger encroachment indicator of claim 1, wherein the light beam forms an arc of light.

3. The passenger encroachment indicator of claim 1, wherein the light source comprises a light emitting diode.

4. The passenger encroachment indicator of claim 1, further comprising a control circuit configured to switch the light source from an OFF state to an ON state upon receiving an input.

5. The passenger encroachment indicator of claim 4, further comprising gesture-controlled sensor communicatively coupled to the control circuit, wherein upon sensing a gesture, the gesture-controlled sensor transmits the input to the control circuit.

6. The passenger encroachment indicator of claim 1, further comprising:
- a controller communicatively coupled to the light source and configured to switch the light source between an OFF state and an ON state; and
- a sensor communicatively coupled to the controller and configured to detect an encroachment of an adjacent passenger to the passenger seating boundary, whereupon a detection of an encroachment of the adjacent passenger to the passenger seating boundary, the controller causes the light source to switch from the OFF state to the ON state.

7. The passenger encroachment indicator of claim 6, whereupon a lack of detection of the encroachment of the adjacent passenger to the passenger seating boundary, the controller causes the light source to switch from the ON state to the OFF state.

8. The passenger encroachment indicator of claim 1, wherein the light source is configured to illuminate a portion of a floor adjacent to the aircraft passenger seat, wherein the light source enables a passenger to detect an object dropped on the portion of the floor.

9. An aircraft passenger seat comprising:
- a passenger encroachment indicator comprising:
  - an armrest for the aircraft passenger seat, the armrest comprising an armrest housing, wherein the armrest housing comprises a window;
  - a light assembly non-movably disposed within the armrest housing, the light assembly comprising:
    - a light source configured to transmit a light beam; and
    - a diffuser configured to shape the light beam, wherein the light beam is projected through the window, wherein a projection of the light beam forms a visual marker that projects into a footwell between the aircraft passenger seat and an adjacent aircraft passenger seat, and defines a passenger seating boundary between the aircraft passenger seat and the adjacent aircraft passenger seat; and a wiring harness electrically coupled between the light assembly and a power source, wherein the wiring harness is incorporated at least partially within the armrest housing.

10. The aircraft passenger seat of claim 9, further comprising a passenger encroachment barrier configured to provide a physical barrier between the aircraft passenger seat and the adjacent aircraft passenger seat, wherein the passenger encroachment barrier comprises a barrier housing, wherein the light source is configured to transmit the light beam outward from the barrier housing.

11. The aircraft passenger seat of claim 9, further comprising a control circuit configured to switch the light source from an OFF state to an ON state upon receiving an input.

12. The aircraft passenger seat of claim 11, further comprising a gesture-controlled sensor communicatively coupled to the control circuit, wherein upon sensing a gesture, the gesture-controlled sensor transmits the input to the control circuit.

13. A method for informing a passenger of an encroachment upon a passenger seat boundary comprising:

switching a light source from an OFF state to an ON state of a light assembly of a passenger encroachment indicator, wherein the passenger encroachment indicator comprises:

an armrest for an aircraft passenger seat, the armrest comprising an armrest housing, wherein the armrest housing comprises a window;

the light assembly non-movably disposed within the armrest housing, the light assembly comprising:

the light source configured to transmit a light beam; and a diffuser configured to shape the light beam, wherein the light beam is projected through the window, wherein a projection of the light beam forms a visual marker that projects into a footwell between the aircraft passenger seat and an adjacent aircraft passenger seat, and defines a passenger seating boundary between the aircraft passenger seat and the adjacent aircraft passenger seat; and a wiring harness electrically coupled between the light assembly and a power source, wherein the wiring harness is incorporated at least partially within the armrest housing, wherein switching the light source from the OFF state to the ON state causes an arc of light to project from the armrest into the footwell, generating the visual marker that defines the passenger seating boundary between two adjacent aircraft passenger seats.

14. The method of claim 13 further comprising before switching the light source, gesturing to a gesture-controlled sensor communicatively coupled to the light source, wherein a detection of a gesture causes a controller to switch the light source from the OFF state to the ON state.

* * * * *